US007400914B2

(12) United States Patent
Schwald

(10) Patent No.: US 7,400,914 B2
(45) Date of Patent: Jul. 15, 2008

(54) WIRELESS HEADPHONES WITH CONNECTOR SOCKET

(75) Inventor: Christoph Schwald, Vienna (AT)

(73) Assignee: AKG Acoustics GmbH, Vienna (AT)

( * ) Notice: Subject to any disclaimer, the term of this patent is extended or adjusted under 35 U.S.C. 154(b) by 503 days.

(21) Appl. No.: 10/664,589

(22) Filed: Sep. 17, 2003

(65) Prior Publication Data

US 2004/0137968 A1 Jul. 15, 2004

(30) Foreign Application Priority Data

Oct. 1, 2002 (AT) ............................ A 1487/2002

(51) Int. Cl.
*H04M 1/00* (2006.01)
*H04M 9/00* (2006.01)
*H04R 25/00* (2006.01)

(52) U.S. Cl. ............. 455/575.2; 455/575.1; 455/569.1; 381/370; 381/376; 379/430

(58) Field of Classification Search ................. 455/573, 455/569.1, 575.1, 575.2, 575.6; 381/370, 381/376; 379/430
See application file for complete search history.

(56) References Cited

U.S. PATENT DOCUMENTS 5,113,428 A 5/1992 Fitzgerald
5,410,735 A * 4/1995 Borchardt et al. ............. 455/42
5,982,904 A * 11/1999 Eghtesadi et al. ............. 381/74
6,006,115 A * 12/1999 Wingate .................. 455/575.2
6,190,208 B1 * 2/2001 Villain ........................ 439/660
6,210,201 B1 * 4/2001 Villain ........................ 439/357
6,473,630 B1 * 10/2002 Baranowski et al. ........ 455/572
6,594,366 B1 * 7/2003 Adams ........................ 381/74
6,606,506 B1 * 8/2003 Jones ...................... 455/556.1
6,978,163 B2 * 12/2005 Dyer et al. ............... 455/575.2
7,010,332 B1 * 3/2006 Irvin et al. ............... 455/575.2
7,024,230 B2 * 4/2006 Curtiss et al. ............ 455/569.1
7,305,253 B2 * 12/2007 Snyder et al. ............... 455/557
2001/0013983 A1 * 8/2001 Izawa et al. .................... 360/2
2002/0067825 A1 * 6/2002 Baranowski et al. ........ 379/430
2003/0087677 A1 * 5/2003 Miller et al. ................ 455/572
2003/0119565 A1 * 6/2003 Lin ........................... 455/569
2004/0052389 A1 * 3/2004 Berg .......................... 381/315
2004/0204158 A1 * 10/2004 Wang et al. .............. 455/569.1
2004/0219881 A1 * 11/2004 Kramp et al. ............. 455/41.2

(Continued)

FOREIGN PATENT DOCUMENTS

CN 2407532 Y 11/2000
CN 2501198 Y 7/2002
JP 56-22880 5/1981
JP 2001-357940 12/2001

*Primary Examiner*—Nay Maung
*Assistant Examiner*—Andrew Wendell
(74) *Attorney, Agent, or Firm*—Friedrich Kueffner

(57) ABSTRACT

Wireless headphones operated by a storage battery and having a connector socket for the insertion of a charge plug of an electric connection into a power pack. The headphones further have at least one miniature loudspeaker, audio electronics, a reception part, and charging electronics to monitor the charging process of the storage battery. In order to be able to use the headphones even with a dead storage battery, a socket is provided for the insertion of a signal plug of an electrical connection with an audio device for the transmission of signals. The audio electronics conduct only the signals received via the signal plug to the loudspeakers when the signal plug is inserted.

4 Claims, 2 Drawing Sheets

U.S. PATENT DOCUMENTS

2004/0248623 A1 * 12/2004 Nelson et al. ............ 455/569.1
2005/0153750 A1 * 7/2005 Gantz et al. .............. 455/569.1
2005/0250559 A1 * 11/2005 Nassimi ................... 455/575.2

* cited by examiner

WIRELESS HEADPHONES WITH CONNECTOR SOCKET

CROSS-REFERENCE TO RELATED APPLICATIONS

This application claims priority of Austria Patent Application Serial No. A1487/2002 filed on Oct. 1, 2002.

BACKGROUND OF THE INVENTION

1. Field of the Invention

The present invention relates to wireless headphones operated by at least one storage battery and having a connector socket to insert a charge plug of an electric connection to a power pack. The headphones further have at least one miniature loudspeaker, audio electronics, and a reception part, as well as charging electronics for the monitoring the charging process of the storage battery. Such headphones are more and more frequently used not only to increase the level of carrying comfort and to extend the range of the audio reception area, but also as an accessory for television sets, units for speaking in open areas, and the like.

2. Description of the Related Art

Independent of whether the storage cell is designed as a single part or multiple parts, the following description sometimes uses the singular and sometimes the plural for better readability, without this representing a limitation. Likewise, sometimes "at least one miniature loudspeaker" is used, since there are applications in which only one such loudspeaker is present, even if in most cases at least two loudspeakers are present.

With wireless headphones, the transfer of information takes place by radio waves or infrared beams. Batteries or storage/rechargeable batteries are provided in the headphones for operating the receiver and the miniaturized loudspeakers in the headphone earpieces. Storage batteries have become increasingly popular for use in wireless headphones, and the use of conventional batteries has become rare. In order to be able to undertake the charging of the storage batteries, without having to take them out of the headphones, a corresponding socket is provided, into which the plug of a power pack can be inserted, which thus charges the storage batteries. Usually, suitable electronics are provided in the headphones for evaluating the charge state of the storage batteries. The electronics also control or end the charging process if the storage batteries have been charged to the limit of their capacity.

For various reasons, for example, universal usage possibility or use even with dead or defective storage batteries, it is desirable to be able to operate such headphones even with a conventional cable, by means of which the loudspeakers are provided directly with the audio signals in sufficient strength to drive the speakers.

SUMMARY OF THE INVENTION

In order to solve this problem, it is the primary object of the present invention to provide wireless headphones that have a socket for the insertion of a conventional audio signal cable. Furthermore, electronics or switch mechanics are provided to switch off the reception electronics when the plug of the signal cable is inserted into the socket and transmit the data transmitted via the cable to the miniaturized loudspeakers in the headphone earpieces.

In a preferred embodiment of the invention a combined socket for the charging process and the signal transmission is provided, into which alternately the customary jacks from the audio cable or the jacks of the charge cable, which are designed similarly in their dimensions in accordance with the invention, but designed differently with conducting or insulating surfaces, can be inserted. As a result of the differently designed conductivities of the surface areas, the switching takes place either mechanically or electronically. With this embodiment, it is also conceivable to charge the storage batteries by means of a special cable, whereas, at the same time, the headphones are operated as traditional, wire-bound headphones. The various features of novelty, which characterize the invention, are pointed out with particularity in the claims annexed to and forming part of the disclosure. For a better understanding of the invention, its operating advantages, and specific objects attained by its use, reference should be had to the drawing and descriptive matter in which there are illustrated and described preferred embodiments of the invention.

DESCRIPTION OF THE PREFERRED EMBODIMENTS

The drawings show, in a completely schematic manner, the supply device, either a power pack or an audio device, and a jack connected by means of a cable. The corresponding sites of the current fed in the socket, and thus in the headphones, are also indicated in a schematic manner. The socket itself is not drawn with its contours in order to provide a clearer view, but rather can be ascertained only by these contact sites.

Figure 1:
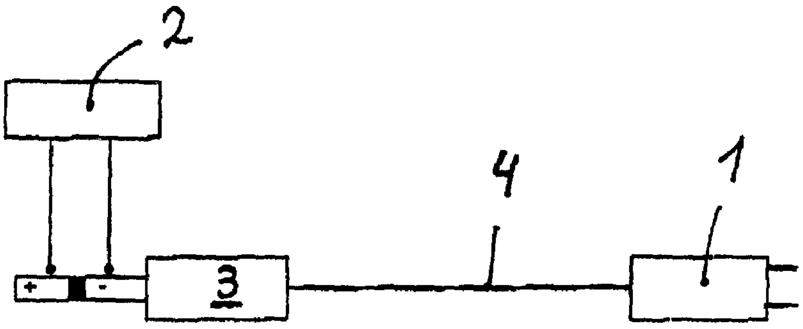
FIG. 1 is a conventional plug of a charge cable, designed as a jack.

FIG. 1 shows a power pack 1, connected with a charge plug 3 by means of a cable 4. The plug 3 has a jack designed with two poles so as to have suitable contact in the socket of charging electronics 2, wherein the current needed to charge the (not depicted) storage batteries is removed and further conducted.

Figure 2:
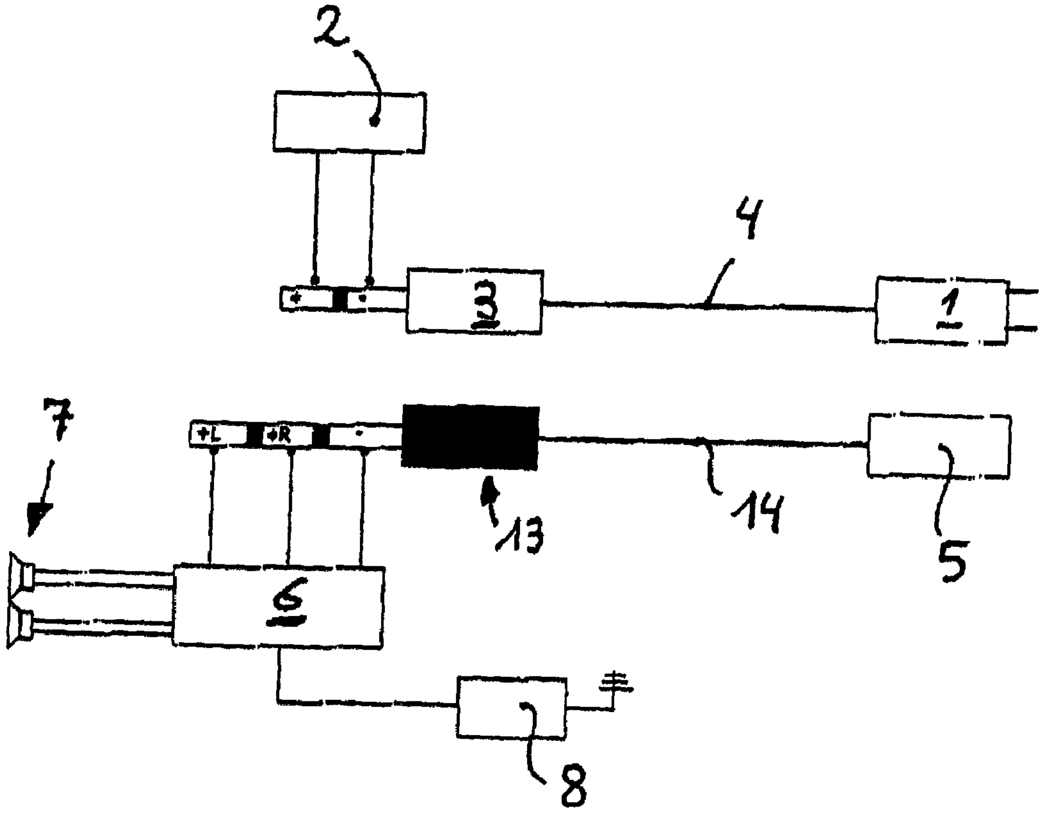
FIG. 2 shows such a charge plug and a common stereo jack, in immediate vicinity to one another.

FIG. 2 shows the basic execution of the invention with two sockets, one to accept a charge plug 3 (similarly designed as shown in FIG. 1) and another socket to accept a common stereo jack 13 that is connected with an audio device 5 by a cable 14. The stereo jack 13 has three conducting surface areas that are separated from one another by two insulating surface areas. In the conventional manner, the signals for the audio electronics 6 are removed and thus the loudspeakers 7 of the headphones are supplied. Reception electronics 8, which hold the connection to a (not depicted) transmission unit with wireless operation and there receive the audio signals, are connected with the audio electronics 6, and are preferably integrated into it. These reception electronics 8 are shut down when a stereo jack 13 is inserted into the socket; preferably the electronics are simply switched without current.

Figure 3:
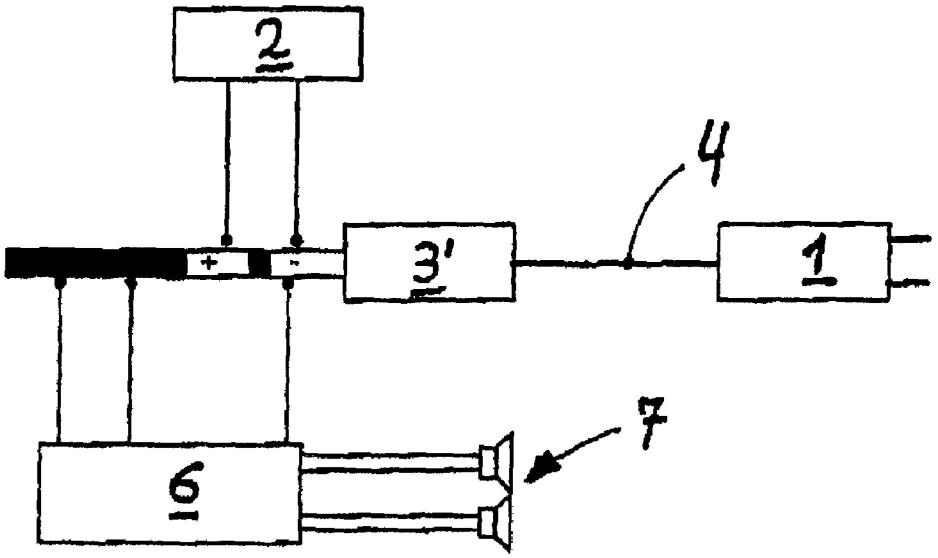
FIG. 3 shows a socket, in accordance with a preferred embodiment of the invention, used for the charging process.
Figure 4:
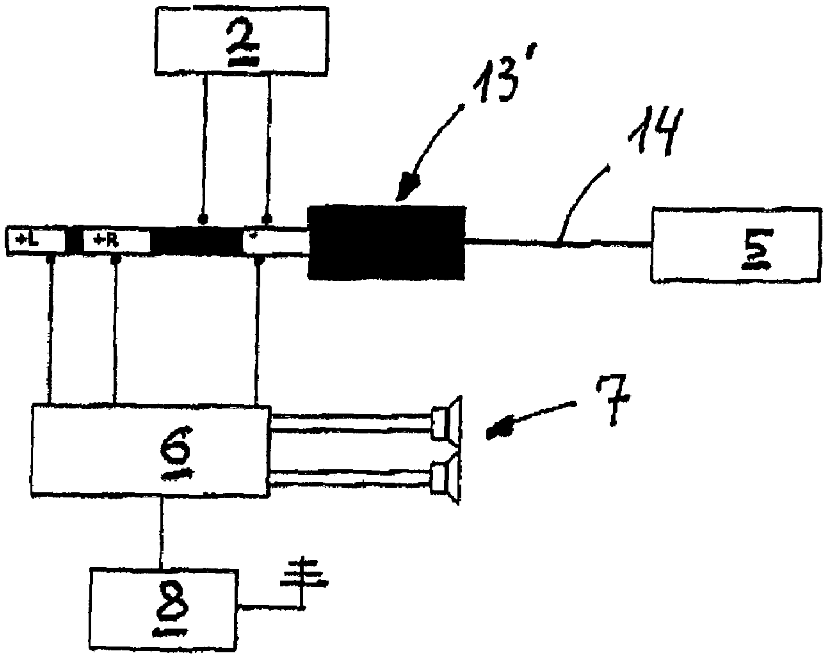
FIG. 4 shows the socket of FIG. 3 used for the transmission of the signals.

FIGS. 3 and 4 show a particularly preferred embodiment of the invention, in which a single socket, not directly depicted, but ascertainable as a complement to the plugs 3', 13', can be used both for the charging process as well as for the directly cable-bound use of the headphones.

As can be seen from FIG. 3, the geometric configuration of the charge plug 3' is selected so that the contacts of the charging electronics 2 make contact with the two separated, conducting surface areas of the charge plug 3' in the socket. The three contact feelers or rods, which lead to the audio electronics 6, only have one contact, whereas the two other contact rods or springs, or the like, make contact with insulating surface areas of the charge plug 3' and switch the audio electronics 6, and thus finally the loudspeakers 7, without current and therefore inactively.

If a correspondingly designed stereo plug or jack 13' is inserted into the same socket, it has a configuration and arrangement of the conducting or insulating area, such that the charging electronics 2, with at least one contact site, comes into contact with one insulating area, whereas the contact sires of the audio electronics 6 all come into contact with electrically conducting areas and thus receive the transmitted stereo signal, and can further conduct it to the loudspeakers 7. Also, in this case, provision is made so that the audio electronics 6, directly or mechanically, as a function of the contacting of a corresponding stereo plug 13', switches off or shuts down the reception part 8 of the audio electronics responsible for the reception of the wireless data transmission.

From the shown and described examples, it is clear that the design of the socket, and thus also the plug, can take place in many diverse ways, wherein it is absolutely possible that the commercial stereo jack can be used as a stereo plug 13,13', which is particularly advantageous for the compatibility of the headphones equipped in accordance with the invention. Of course, it is possible, without any problems, and something easy for those skilled in the relevant art, to conceive of developments and configurations of plugs that fulfill the different requirements, whether in a geometric sense or in a functional sense, so that with a corresponding arrangement of the contact rods or contact points in the box there is also the possibility of providing a combination plug that permits the charging of the storage batteries simultaneously with the wire-bound operation of the headphones.

The invention is not limited by the embodiments described above which are presented as examples only but can be modified in various ways within the scope of the protection defined by the appended patent claims.

I claim:

1. Wireless headphones, comprising: a storage battery; a connector socket for receiving a charge plug of an electric connection into a power pack; at least one miniature loudspeaker; audio electronics connected to the loudspeaker; a reception part connected to the audio electronics for receiving wireless signals; charging electronics operative to monitor a charging process of the storage battery, the charging electronics having a first contact within the connector socket and contacting the surface areas of the charge plug when the charge plug is inserted into the connector socket, the audio electronics having a second contact within the connector socket and contacting the surface areas of a signal plug when the signal plug is inserted into the connector socket, the signal plug being part of an electric connection with an audio device for the transfer of signals, wherein current is supplied from the power pack to the charging electronics via the first contact when the charge plug is inserted into the connector socket, and the audio device is configured to transmit a stereo signal from the audio device to at least the one miniature loudspeaker via the second contact when the signal plug is inserted into the connector socket.

2. Headphones according to claim 1, wherein the audio electronics are operative to switch off the reception part when the signal plug is inserted.

3. Headphones according to claim 1, wherein the audio electronics recognize the type of plug inserted by contacting the different electrically conducting or electrically insulating surface areas of the plugs.

4. Headphones according to claim 1, wherein the signal plug is a conventional stereo jack.

* * * * *